(12) United States Patent
Mukherjee et al.

(10) Patent No.: US 10,678,886 B2
(45) Date of Patent: Jun. 9, 2020

(54) SYSTEMS AND METHODS FOR ANALYZING SENSOR DATA USING INCREMENTAL AUTOREGRESSION TECHNIQUES

(71) Applicant: Tata Consultancy Services Limited, Mumbai (IN)

(72) Inventors: Debnath Mukherjee, Kolkata (IN); Suman Datta, Kolkata (IN); Prateep Misra, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 154 days.

(21) Appl. No.: 15/395,439

(22) Filed: Dec. 30, 2016

(65) Prior Publication Data

US 2017/0208081 A1     Jul. 20, 2017

(30) Foreign Application Priority Data

Jan. 1, 2016   (IN) .............................. 201621000095

(51) Int. Cl.
| | |
|---|---|
| *H04L 29/06* | (2006.01) |
| *G06F 21/00* | (2013.01) |
| *G06F 17/18* | (2006.01) |
| *G06F 17/10* | (2006.01) |
| *H04L 29/08* | (2006.01) |

(52) U.S. Cl.
CPC .............. *G06F 17/18* (2013.01); *G06F 17/10* (2013.01); *H04L 67/12* (2013.01)

(58) Field of Classification Search
CPC ........... G06F 17/18; G06F 17/10; H04L 67/12
See application file for complete search history.

(56) References Cited

U.S. PATENT DOCUMENTS

| | | | |
|---|---|---|---|
| 4,232,400 A | * | 11/1980 | Yamamoto ............... H04B 3/23 327/552 |
| 7,945,570 B2 | | 5/2011 | Papadimitriou et al. |
| 2004/0199368 A1 | * | 10/2004 | Bechhoefer ............ G01H 1/003 703/7 |
| 2006/0010101 A1 | | 1/2006 | Suzuki et al. |
| 2006/0200034 A1 | * | 9/2006 | Ricci .................. G06K 9/00523 600/513 |

(Continued)

*Primary Examiner* — Alexander Lagor
*Assistant Examiner* — Rodman Alexander Mahmoudi
(74) *Attorney, Agent, or Firm* — Finnegan, Henderson, Farabow, Garrett & Dunner LLP

(57) ABSTRACT

This disclosure relates to systems and methods for analyzing sensor data using incremental autoregression techniques for generating a vector of autoregression coefficients is provided. The system processes a time series data to obtain blocks of observation values, reads the observation values, updates pre-stored convolution values with the observation values, updates a partial sum by adding each observation value to the partial sum, increments a count each time an observation value is read, repeats the steps of updates and increments until a last observation value from a last block is read to obtain an updated set of convolution values, partial sum, and count. The system further computes a first matrix and a second matrix using the updated set of convolutions values, or summation of observation values computed from the updated partial sum, or the updated count, and generates a vector of autoregression coefficients based on the first and the second matrix.

9 Claims, 4 Drawing Sheets

(56) References Cited

U.S. PATENT DOCUMENTS

| | | |
|---|---|---|
| 2011/0160927 A1 | 6/2011 | Wilson et al. |
| 2015/0177030 A1* | 6/2015 | Vilim ................ G01D 3/08 |
| | | 702/183 |
| 2016/0093343 A1* | 3/2016 | Ovsiannikov ....... G06F 12/0802 |
| | | 365/189.02 |

* cited by examiner

SYSTEMS AND METHODS FOR ANALYZING SENSOR DATA USING INCREMENTAL AUTOREGRESSION TECHNIQUES

PRIORITY CLAIM

This U.S. patent application claims priority under 35 U.S.C. § 119 to: India Application No. 201621000095, filed on Jan. 1, 2016. The entire contents of the aforementioned application are incorporated herein by reference.

TECHNICAL FIELD

This disclosure relates generally to data analysis systems, and more particularly to systems and methods for analyzing sensor data using incremental autoregression techniques.

BACKGROUND

With the wide deployment of sensors and the emergence of the Internet of things (IoT), there arises a need for analysis of sensor data. Sensor data can be viewed as a time series i.e. a sequence of (time, value) pairs. Time series analysis includes statistical analysis such as linear regression, moving average and auto-regression. However, the time series analysis in the IoT platforms, require heavy investment in infrastructure. Often, to analyse a time series, the entire time series is loaded into memory, whether it is on one machine or on multiple distributed machines.

Current processing systems for autoregression require large amount of memory as, often, entire datasets are loaded into the memory. Such processing systems for autoregression are not optimized for running in an environment where a number of tasks are executed on the same machine, since each job has high memory overhead. Therefore, the systems may fail to process large chunks of data in the worker nodes, as the worker nodes typically tend to load the entire data of the partition in the memory, thereby resulting in system overhead and large memory consumption which leads to slow performance of machines.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides systems and methods for analyzing sensor data using incremental autoregression techniques.

In one embodiment, a computer implemented method is provided. The method comprises (a) processing a time series data to obtain one or more blocks of observation values; (b) reading a first observation value from the one or more blocks of observation values; (c) updating a set of convolution values stored in a memory with the first observation value; (d) updating a partial sum by adding the first observation value to the partial sum; (e) incrementing a count of observations in a count variable each time an observation value is read; (f) repeating (b) till (e) until a last observation value is read from a last block from the one or more blocks of observation values to obtain an updated set of convolution values, an updated partial sum, and an updated count; (g) computing a first set of elements for a first matrix using at least one of (i) the updated set of convolutions values, (ii) summation of observation values computed from the updated partial sum, or (iii) the updated count; (h) computing a second set of elements for a second matrix using at least one of (i) the updated set of convolution values, or (ii) the summation of observation values computed from the partial sum; and (i) generating a vector of autoregression coefficients based on the first matrix and the second matrix. In an embodiment, the time series data is obtained from one or more sensors. In a further embodiment, the vector of autoregression coefficients is generated in a batch mode. In yet further embodiment, the vector of autoregression coefficients is generated at one or more pre-defined intervals in a streaming mode.

In another embodiment, a computer implemented system is provided. The system comprises a memory storing instructions, and a set of convolution values; a communication interface; and a hardware processor coupled to the memory, wherein the hardware processor is configured by the instructions to (a) process a time series data to obtain one or more blocks of observation values; (b) read a first observation value from the one or more blocks of observation values, (c) update a set of convolution values stored in the memory with the first observation value, (d) update a partial sum by adding the first observation value to the partial sum, (e) increment a count of observations in a count variable each time an observation value is read, (f) repeat (b) till (e) until a last observation value is read from a last block from the one or more blocks of observation values to obtain an updated set of convolution values, an updated partial sum, and an updated count, (g) compute a first set of elements for a first matrix using at least one of (i) the updated set of convolutions values, (ii) summation of observation values computed from the updated partial sum, or (iii) the updated count, (h) compute a second set of elements for a second matrix using at least one of (i) the updated set of convolution values, or (ii) the summation of observation values computed from the partial sum, and (i) generate a vector of autoregression coefficients based on the first matrix and the second matrix. In an embodiment, the time series data is obtained from one or more sensors. In one embodiment, the vector of autoregression coefficients is generated in a batch mode. In another embodiment, the vector of autoregression coefficients is generated at one or more pre-defined intervals in a streaming mode.

In yet another embodiment, one or more non-transitory machine readable information storage mediums comprising one or more instructions is provided. The instructions when executed by one or more hardware processors causes (a) processing a time series data to obtain one or more blocks of observation values; (b) reading a first observation value from the one or more blocks of observation values; (c) updating a set of convolution values stored in a memory with the first observation value; (d) updating a partial sum by adding the first observation value to the partial sum; (e) incrementing a count of observations in a count variable each time an observation value is read; (f) repeating (b) till (e) until a last observation value is read from a last block from the one or more blocks of observation values to obtain an updated set of convolution values, an updated partial sum, and an updated count; (g) computing a first set of elements for a first matrix using at least one of (i) the updated set of convolutions values, (ii) summation of observation values computed from the updated partial sum, or (iii) the updated count; (h) computing a second set of elements for a second matrix using at least one of (i) the updated set of convolution values, or (ii) the summation of observation values computed from the partial sum; and (i) generating a vector of autoregression coefficients based on the first matrix and the second matrix. In an embodiment, the time series data is obtained from one or more sensors. In a further embodiment, the vector of autoregression coefficients is generated in a batch mode. In yet further embodiment, the vector of autoregression coefficients is generated at one or more pre-defined intervals in a streaming mode.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
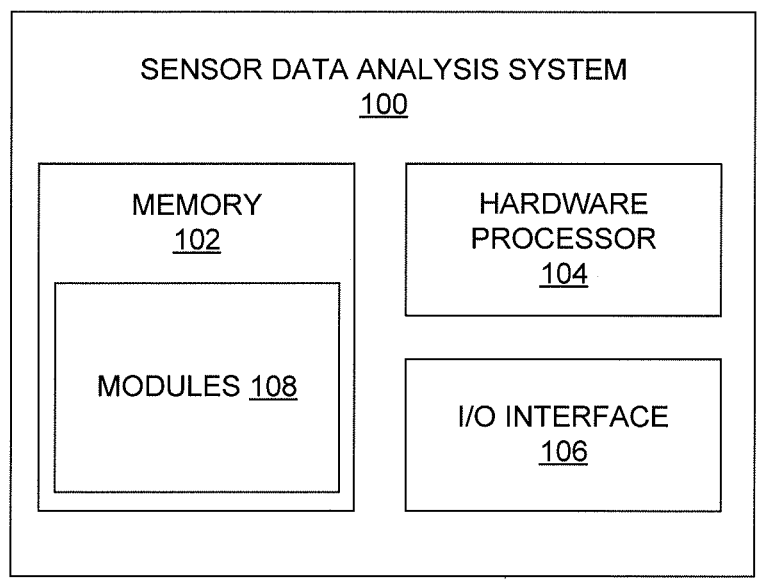
FIG. 1 is a block diagram of a sensor data analysis system according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms.

Before setting forth the detailed explanation, it is noted that all of the discussion below, regardless of the particular implementation being described, is exemplary in nature, rather than limiting.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 is a block diagram of a sensor data analysis system 100 according to an embodiment of the present disclosure. The terms "sensor data analysis system" and "system" may be interchangeably used herein after. The system 100 comprises a memory 102, a hardware processor 104, and an input/output (I/O) interface 106. Although the exemplary block diagram and the associated description refers to a memory and a hardware processor, it may be understood that one or more memory units and one or more hardware processors may be comprised in the sensor data analysis system 100. The memory 102 further includes one or more functional modules. The memory 102, the hardware processor 104, the input/output (I/O) interface 106, and/or the modules may be coupled by a system bus or a similar mechanism. The sensor data analysis system 100 generates one or more autoregression coefficients for a given time series data comprising one or more blocks of observation values. The one or more sensor data are analyzed by the system 100 based on information received from one or more sensors (not shown in FIG. 1) through one or more networks (not shown in FIG. 1).

The memory 102, may store instructions, any number of pieces of information, and data, used by a computer system, for example the system 100 to implement the functions of the system 100. The memory 102 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, applications, instructions or the like for enabling the system 100 to carry out various functions in accordance with various example embodiments.

Additionally or alternatively, the memory 102 may be configured to store instructions which when executed by the hardware processor 104 causes the system 100 to behave in a manner as described in various embodiments. The memory 102 stores the functional modules and information, for example, information (e.g., time series data) received from the one or more sensors (not shown in FIG. 1) through the one or more networks (not shown in FIG. 1).

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102. The hardware processor 104 may include circuitry implementing, among others, audio and logic functions associated with the communication. For example, the hardware processor 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 104 thus may also include the functionality to encode messages and/or data or information. The hardware processor 104 may include, among others a clock, an arithmetic logic unit (ALU) and logic gates configured to support operation of the hardware processor 104. Further, the hardware processor 104 may include functionality to execute one or more software programs, which may be stored in the memory 102 or otherwise accessible to the hardware processor 104.

Figure 2A:
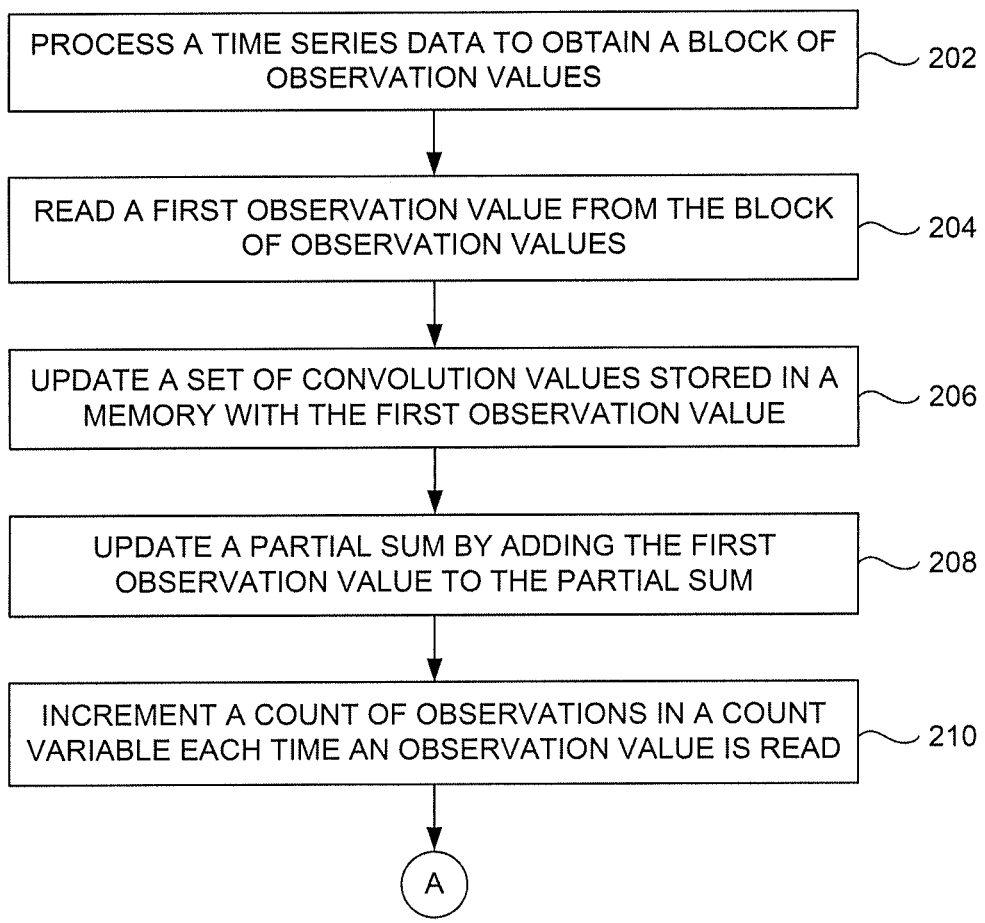
FIG. 2 illustrates a flow diagram of a computer implemented method for sensor data analysis using the sensor data analysis system of FIG. 1 by applying an incremental autoregression technique, in accordance with an embodiment of the present disclosure.
Figure 2B:
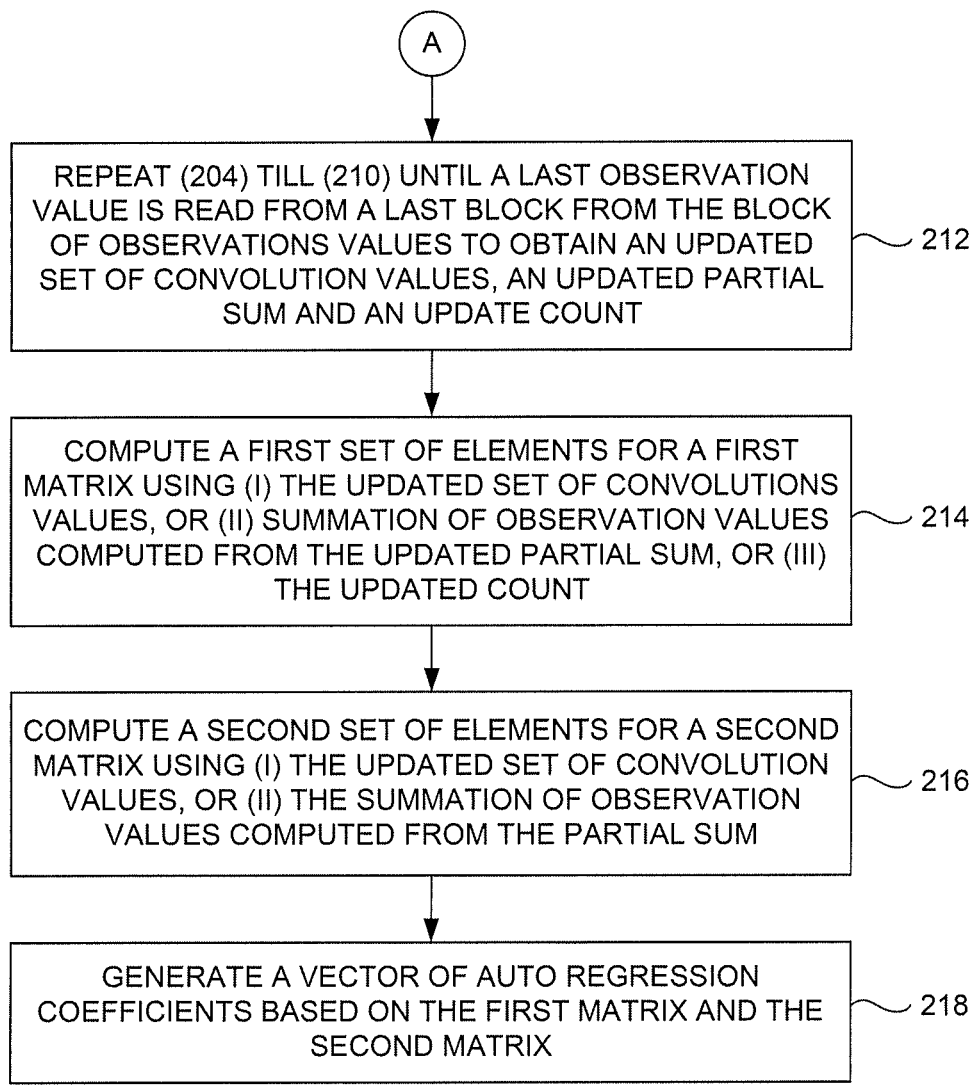

FIG. 2 illustrates a flow diagram of a computer implemented method for sensor data analysis using the sensor data analysis system 100 of FIG. 1 by applying an incremental autoregression technique, in accordance with an embodiment of the present disclosure. The steps of the method of the present disclosure will now be explained with reference to the components of the system 100 as depicted in FIG. 1. The hardware processor 104 is configured by the instructions stored in the memory 102. The hardware processor 104 when configured by the instructions enables autoregression coefficients generation as described hereinafter. In an embodiment, at step 202, the hardware processor 104 processes a time series data to obtain one or more blocks of observation values. In one example embodiment, the time series data is obtained from the one or more sensors. In some scenarios, value of a time series data at a given point may be dependent on previous values of the time series data. To illustrate, autoregression can be observed in the below illustrative expression (1):

$$X_t = \alpha_1 X_{t-1} + \alpha_2 X_{t-2} + \ldots + \alpha_k X_{t-k} + c + w_t \quad (1)$$

where $X_t$ is the value of the time series at time t, $\alpha_i$ are some constants, c is an intercept term (also referred herein as a constant) and $w_t$ is an error term. "k" is referred to as "order" of the regression. The incremental autoregression technique is applied for the given set of time series date that comprises one or more blocks of observations values to compute (or determine) values of $\alpha_i$ and c.

Given the equation (1), the embodiments of the present disclosure enables the sensor data analysis system 100 to minimize the sum of the squared error $w_t$.

Suppose there are t observations, then one or more blocks of observation values are illustrated below in the expressions (2), (3), (4), and (5):

$$x = \alpha_1 x_{t-1} + \alpha_2 x_{t-2} + \ldots + \alpha_k x_{t-k} + c + w_t \quad (2)$$

$$x_{t-1} = \alpha_1 x_{t-2} + \alpha_2 x_{t-2} + \ldots + \alpha_k x_{t-k-1} + c + w_{t-1} \quad (3)$$

$$x_{t-i} = \alpha_1 x_{t-i-1} + \alpha_2 x_{t-i-2} + \ldots + \alpha_k x_{t-i-k} + c + w_{t-i} \quad (4)$$

$$X_{k+1} = \alpha_1 x_k + \alpha_2 x_{k-1} + \ldots + \alpha_k x_1 + c + w_{k+1} \quad (5)$$

Here 'k' is the order of the autoregression.

At step 204, a first observation value is read from the one or more blocks of observation values (also referred herein as a set of observation values). At step 206, a set of convolution values stored in the memory 102 are updated with the first observation value. In other words, a set of pre-stored convolution values are updated with the first observation value. At step 208, a partial sum is updated by adding the first observation value to the partial sum. At step 210, a count of observations is incremented in a count variable each time an observation value is read. In other words, when the first observation value is read, the count of observation is incremented by 1 in a count variable. At step 212, the steps 204 till 210 are repeated until a last observation value is read from a last block from the one or more blocks of observation values to obtain updated set of convolution values, an updated partial sum, and an updated count. The steps 204 till 210 that are repeated form the incremental autoregression technique, in one example embodiment. The partial sum or the updated partial sum is a summation of observation values up to the current point in the time series data. Then the summation of the squared error is illustrated below in the expression (6):

$$\Sigma_{i=0}^{t-k-1}(x_{t-i} - \alpha_1 x_{t-i-1} - \ldots - \alpha_k x_{t-i-k} - c)^2 \quad (6)$$

When the summation of the squared error is differentiated with respect to $\alpha_1$ and setting it equal to zero and further simplifying, the following is obtained in the expression (7):

$$\alpha_1 \Sigma_{i=0}^{t-k-1} x_{t-i-1}^2 + \ldots + \alpha_k \Sigma_{i=0}^{t-k-1} x_{t-i-k} x_{t-i-1} + c \Sigma_{i=0}^{t-k-1} x_{t-i-1} = \Sigma_{i=0}^{t-k-1} x_{t-i} x_{t-i-1} \quad (7)$$

At step 214, a first set of elements for a first matrix is computed using at least one of (i) the updated set of convolutions values, (ii) summation of observation values computed from the updated partial sum, or (iii) the updated count. In one example embodiment, the first set of elements for the first matrix is computed using the updated set of convolutions values. In another example embodiment, the first set of elements for the first matrix is computed using the summation of observation values computed from the updated partial sum. In yet another example embodiment, the first set of elements for the first matrix is computed using the updated count at a current point in the time series data that corresponds to a current observation value being read. When the squared error is differentiated with respect to $\alpha_2 \ldots \alpha_k$ and c and setting equal to zero, a set of simultaneous equations of the form A*B=C is obtained, where A corresponds to the first matrix having the first set of computed elements and is illustrated below in the expression (8):

$$A = \begin{bmatrix} \sum_{i=0}^{t-k-1} x_{t-i-1}^2 & \cdots & \sum_{i=0}^{t-k-1} x_{t-i-1} \\ \cdots & \cdots & \cdots \\ \sum_{i=0}^{i=t-k-1} x_{t-i-1} & \cdots & \sum_{i=0}^{t-k-1} 1 \end{bmatrix} \quad (8)$$

At step 216, a second set of elements for a second matrix 'C' is computed using at least one of (i) the updated set of convolutions values, or (ii) the summation of observation values computed from the partial sum. In one example embodiment, the second set of elements for the second matrix is computed using the updated set of convolutions values. In another example embodiment, the second set of elements for the second matrix is computed using the summation of observation values computed from the partial sum. The second matrix 'C' having the second set of elements is illustrated below in the expression (9):

$$C = \begin{bmatrix} \sum_{i=0}^{t-k-1} x_{t-i} x_{t-i-1} \\ \cdots \\ \sum_{i=0}^{t-k-1} x_{t-i} \end{bmatrix} \quad (9)$$

At step 218, a vector of autoregression coefficients 'B' is generated based on the first matrix 'A' and the second matrix 'C'. In other words, the set of simultaneous equations of the form A*B=C is solved to obtain the vector of autoregression coefficients 'B'. In one example embodiment, the vector of autoregression coefficients 'B' is obtained and expressed as $B = A^{-1} * C$. Upon solving $A^{-1} * C$, 'B' is obtained and is illustrated below in the expression (10)

$$B = \begin{bmatrix} \alpha_1 \\ \cdots \\ c \end{bmatrix} \quad (10)$$

Based on the experimental results/data, from the first matrix 'A' obtained, it is observed that the elements of a first row of the first matrix 'A' are obtained and expressed as below:

$A[1,1] = x_k^2 + x_{k+1}^2 + \ldots + x_{t-1}^2$ $A[1,2] = x_{k-1} x_k + x_k x_{k+1} + \ldots + x_{t-2} x_{t-1}$ $A[1,k] = x_1 x_k + x_2 x_{k+1} + \ldots + x_{t-k} x_{t-1}$ $A[1,k+1] = x_k + \ldots + x_{t-1}$ From the above expressions of the first row elements, it is observed that:
A[1, 1] is a convolution of the x values with a shifted version of itself with shift of 0 (thus leading to a sum of squares) and starts from $x_k$.
A[1, 2] is a convolution of the x values with a shifted version of itself with shift 1 starting from $x_k$.
A[1, k] is a convolution of the x values with a shifted version of itself with shift (k−1) and starts from $x_k$.
A[1, k+1] is a summation of the x values and starts from $x_k$.
It is observed that the elements of a second row of the first matrix 'A' are obtained and expressed as below:

$A[2,1] = x_{k-1} x_k + \ldots + x_{t-2} x_{t-1}$ $A[2,2] = x_{k-1}^2 + \ldots + x_{t-2}^2$ $A[2,k] = x_1 x_{k-1} + \ldots + x_{t-k} X_{t-2}$ $A[2,k+1] = x_{k-1} + \ldots + x_{t-2}$ From the above expressions of the first row elements, it is observed that:
A[2, 1] is a convolution of x values with a shifted version of itself with shift 1 and starting from $x_k$.

A[2, 2] is a convolution of x values with a shifted version of itself with shift 0 and starting from $x_{k-1}$.
A[2, k] is a convolution of x values with a shifted version of itself with shift k−2 and starting from $x_{k-1}$.
A[2, k+1] is a sum of x values and starting from $x_{k-1}$.
It is observed that the elements of a k+1th row of the first matrix 'A' are obtained and expressed as below:

$A[k+1,1] = x_k + \ldots + x_{t-1}$ $A[k+1,2] = x_{k-1} + \ldots + x_{t-2}$ $A[k+1,k] = x_1 + \ldots + x_{t-k}$ $A[k+1,k+1] = 1 + \ldots + 1 (t-k) \text{times}$ The following pattern emerges from the above observations: (i) each element of the matrix A is a sum of (t−k) elements, (ii) the elements in column k+1 are sums, and not convolutions, and (iii) the elements in row (k+1) are all summations of x values, except for column (k+1) which is a summation of 1's. The convolutions can be characterized by one or more parameters, for example, shift d and start offset 's'. In an instance, A[1, 1] is a convolution with d=0, and s=k. The convolution is denoted by the function conv (d,s). Similarly, it may be noted for the C matrix:

$C[1, 1] = conv(1, k + 1)$ $C[2, 1] = conv(2, k + 1)$ $\ldots$ $C[k, 1] = conv(k, k + 1)$ $C[k + 1, 1] = x_{k+1} + \ldots + x_t (\text{i.e., sum}(k + 1))$ Here, a function sum(i) is used, which is the summation of t−k x values starting from $x_i$. A count function is defined for computing the A[k+1, k+1] which returns t−k.

Based on the previous observations, the technique for incremental autoregression is arrived. In this incremental autoregression technique, the model is a set of convolutions of x with itself, denoted by an array D, where:
D[0] is a convolution of x with itself with a shift of 0 i.e., $D[0] = x_1^2 + x_2^2 \ldots + x_t^2$.
Similarly, $D[1] = x_1 x_2 + \cdots + x_{t-1} x_t$ $\ldots$ $D[k - 1] = x_1 x_k + \cdots + x_{t-k+1} x_t$ The (k+1)th column of each row of the A matrix is a sum. Thus a sum, sum_values, of the all the x values observed so far is maintained. The (k+1)th column of the (k+1)th row is a count of the number of x values i.e., the number of data points. This is maintained in a variable called count.

The embodiments of the present disclosure describes an illustrative incremental autoregression technique as below:
1. Read in a x value. (For I/O optimization a block of x values may be read in and a single value from the x values may be used in the following steps)
2. For each value x, update the D array
3. Add the x value to the sum_values variable
4. Increment the count variable by 1
5. If there are more x values go to 1. Otherwise, go to 6

6. Compute the element A[i, j] using the cony function, sum function or count function according to the values of i and j, as can be inferred from the previous observations.
7. Compute the element C[i] using the cony function or sum function, as inferred from the previous observations
8. Solve the simultaneous equations A*B=C to obtain B using the formula: $A^{-1}C$ The values of the vector B are the coefficients of the autoregression. It is to be noted that the cony function can be computed from the D array, which is illustrated by way of example below. Note:

$$A[1, 1] = x_k^2 + x_{k+1}^2 + \cdots + x_{t-1}^2$$
$$= (x_1^2 + x_2^2 + \cdots + x_t^2) - (x_1^2 + x_2^2 + \cdots + x_{k-1}^2) - (x_t^2)$$
$$= D[0] - (x_1^2 + x_2^2 + \cdots + x_{k-1}^2) - (x_t^2)$$

Thus the cony( ) values may be obtained from D values by subtracting the summation of (few) initial elements (called "lowconv", in this scenario, the summation of $x_1^2$ up-to $x_{k-1}^2$) and the summation of some final elements (called "highconv", in this scenario $x_t^2$). Thus, conv( . . . )= D[ . . . ]–lowconv–highconv. As the conv( ) is a summation of t–k values and D is a summation of t values, if the D array is pre-computed as in incremental autoregression technique described above, then computing conv( ) involves t–(t–k) additions i.e., k additions and 2 subtractions. Thus cony is an O(k) operation. It is to be further noted that that the sum(i) values can be computed in a similar manner using the following illustrative expression: sum( . . . )=sum_values–lowsum–highsum.

For instance, referring to the expression for C[k+1], sum(k+1)=sum_values–lowsum–highsum, where sum_values=$x_1$+ . . . +$x_t$, lowsum=$x_1$+ . . . +$x_k$ and highsum is 0).

This also involves k additions and 2 subtractions (it is to be noted that sum_values is already pre-computed) and thus is an O(k) operation.

Computational complexity analysis: When a new x value comes in, the k D values are updated which is an O(k) operation. The sum_values and count variables are updated which are O(1) operations. Overall, updating the model (which is the D array) is an O(k) operation. In one example embodiment, the vector of autoregression coefficients is generated in a batch mode. For the batch case, as there are t x values, the updation of the model takes O(kt) time. As the t value could be large, O(kt) is the dominant term. The remaining computation when all the D values have been computed involves:
 i. Computing the cony function for each row of A except for the (k+1)th row and for each column except for the (k+1)th column. This can be observed to be: $O(k^2)$ cony computations thus leading to a complexity of $O(k^3)$ (since each cony computation is O(k)).
 ii. For the (k+1)th column of the first k rows, sum function is invoked. Similarly for the (k+1)th row except for the (k+1)th column, sum functions are invoked. These two computations together form $O(k^2)$.
 iii. Count function is invoked which is already pre-computed and hence is O(1).
 iv. The process of solving the simultaneous equations would take $O(k^3)$ in total (e.g., using Gaussian elimination).

In another example embodiment, the vector of autoregression coefficients is generated at one or more pre-defined intervals (e.g., in a streaming mode). For the streaming case, coefficients may be computed periodically (the complexity per step (or "tick") being $O(k^3)$) and in the other steps, only the model is updated (O(k) complexity).

Memory complexity analysis: There are three matrices to be maintained: the first matrix 'A' which is (k+1)*(k+1), matrix (also referred as the vector 'B') which is (k+1*1), the second matrix 'C' which is (k+1*1), giving a total of $O(k^2)$ memory. In addition, the model includes the O(k) D array and the O(1) sum_values and count variables. From the memory complexity analysis above, it is noted that the memory requirement does not depend on the size of the data (observations), rather it depends only on the order of the autoregression, which is usually a small number.

Order estimation: In autoregression technique, one of the requirement is to estimate the value of "k", the order of the autoregression. The embodiments of the present disclosure adopts the one or more techniques (e.g., techniques such as Akaike's Information Criterion, (AIC)). Order estimation can be done on a small subset (sample) of the data. For streaming applications, the order can be determined and updated periodically based on the last M observations, where M is configurable. The AIC may be used to determine the order, k. For batch applications, as the intent is to find a single autoregression model for the whole data, the order is essentially fixed, and can be determined from a sample of the observations.

Alternatively, the sensor data analysis system 100 may execute the modules 108 comprising an input processing module that when executed by the hardware processor 104 processes an input comprising a time series data to obtain one or more blocks of observation values, and further reads the first observation value from the one or more blocks of observation values). The time series data may be processed by using an input adapter to convert data into suitable form. A model data structure may be implemented by the sensor data analysis system 100 which captures the features (compiled from the incoming data) that are relevant for the processing by the "process" component. The modules 108 may further include an updating module that when executed by the hardware processor 104 updates (i) the set of pre-stored convolution values in the memory 102 with the first observation value, (ii) the partial sum by adding the first observation value to the partial sum, (iii) increments a count of observations in a count variable each time an observation value is read, and these steps (i), (ii), and (iii) are repeated by the hardware processor 104 (or by the updating module) until a last observation value is read from a last block from the one or more blocks of observation values to obtain the updated set of convolution values, an updated partial sum, and an updated count. In an embodiment, the sensor data analysis system 100 may comprise a memory buffer to store input buffer such as time series data, the updated set of convolution values, an updated partial sum, and an updated count. The count of observations is stored in a count variable that is initialized (or stored) in the memory 102. The modules 108 may further includes a computation module that when executed by the hardware processor 104 computes the first set of elements for the first matrix 'A' is computed using (i) the updated set of convolutions values, or (ii) the summation of observation values computed from the updated partial sum, or (iii) the updated count. Similarly, the computation module when executed by the hardware processor 104 further computes the second set of elements for the second matrix 'C' using (i) the updated set of convolutions values, or (ii) the summation of observation values computed from the partial sum. The modules 108 may further comprise a vector generation module that when executed by the hardware processor 104 generates the vector of autoregression coefficients 'B' based on the first matrix 'A' and the second matrix 'C'. In an embodiment, the sensor data analysis system 100 may comprise an output adapter for converting the data output by the process component into a format suitable for output such as autoregression coefficients.

The modules 108 for example, the input processing module, the updating module, the computation module, and the vector generation module are implemented as at least one of a logically self-contained part of a software program, with a logically self-contained part of a software program embedded into each of the hardware component (e.g., the memory 102) that when executed perform the above method(s) described herein, in one embodiment.

Experimental Results/Set up:
The experiments were conducted to validate the hypothesis that the incremental autoregression technique consumes less memory. The experiments were conducted on a Windows 7 virtual machine with Intel Core I5 2.67 GHz CPU and 1 GB of RAM. R 3.0.3 was used as the programming platform, and the techniques were implemented as R scripts. Memory consumption was measured and is reported in the below table. More specifically, the table below is an illustrative comparison of memory usage consumption in Mega Byte (MB) between conventional technique such as autoregression technique and proposed incremental autoregression technique. Memory was measured using a script that was run while the incremental technique was executed.

| Benchmark | Autoregression | Incremental Autoregression |
|---|---|---|
| 100K | 33.29 | 21.71 |
| 500K | 114.37 | 23.51 |
| 1M | 216.18 | 25.1 |

Figure 3:
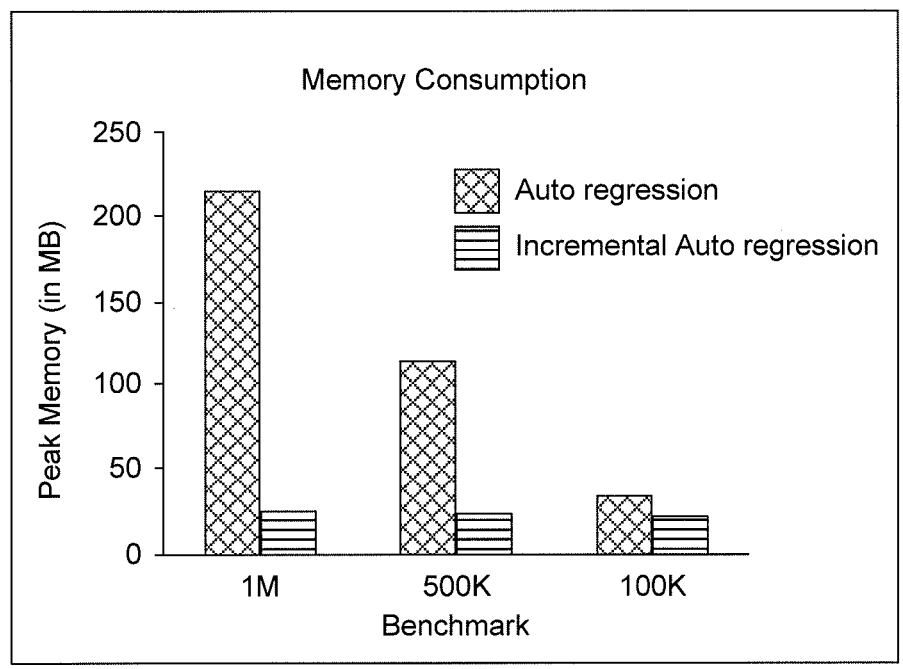
FIG. 3 illustrates a graphical representation depicting comparison of memory usage consumption in Megabyte (MB) between conventional technique such as autoregression technique and proposed incremental autoregression technique according to an embodiment of the present disclosure.

FIG. 3, with reference to FIGS. 1-2, is a graphical representation depicting comparison of memory usage consumption in Megabyte (MB) between conventional technique such as autoregression technique and proposed incremental autoregression technique according to an embodiment of the present disclosure.

The embodiments of the present disclosure enables the sensor data analysis system 100 to implement the incremental autoregression technique in one or more systems. In many plants (factories), it is an important requirement to determine anomalous operation of machines in the factories. For this purpose, the machines may be equipped with one or more sensors which measure various signals emanating from it. One of the ways to model the sensors is to fit an autoregressive model to the signal data stream. The autoregressive model is constantly compared with the actual observation to find anomalies. To illustrate, say at time t1, the value of the signal is V1. Then, using the pre-computed autoregressive model, the system computes the expected value at time t1+1, which can be called as a value V_predicted. The system then measures the observed value of the signal at time t1+1, which is a value called V_actual. If the difference between V_actual and V_predicted is more than a pre-defined configurable threshold, V_diff, then the system has given an anomalous reading, and the operators are alerted about it. Thus, the condition for alerting is:

$$|V\_actual - V\_predicted| > V\_diff$$

Computing autoregression coefficients in batch mode: To compute the autoregression, the previous values of the sensor observations are collected in a "training set". The training set chosen is such that there are no anomalies within it—this can be certified (or authenticated) by the domain experts and/or factory operations personnel who know the historical behavior of the machines. Once the training set is chosen, the incremental autoregression is run on the training set. Note that the training set may be large, and so incremental autoregression technique is required to compute the autoregression in a memory in an efficient manner. The coefficients computed for the autoregressive model are used to compute V_predicted.

Computing autoregression coefficients in streaming mode: Sometimes, the autoregressive model may vary with time. In this case, autoregression is computed periodically in a streaming version of the autoregression. Say, the autoregression is computed periodically with period M. Then, say the autoregressive model is already computed at time t1. The next autoregression needs to be computed at time t1+M. During the time interval (t1, t1+M), only the D array, count and summation values are computed based on the values of the sensor observations. At time t1+M, the autoregression coefficients are computed by solving the simultaneous equations. The newly computed values are then used to compute the predicted value. The methodology of autoregression used is that of the incremental autoregression—the whole data of the stream is not stored; at each arriving data only the D array, count and summation values are updated, and when the autoregression coefficients needs to be computed (at t1+M), then the A and C matrices are computed ("cony" values, count and summation values are used to compute the A and C matrices) and simultaneous equations are solved to compute the B array which contains the coefficients.

Figure 4:
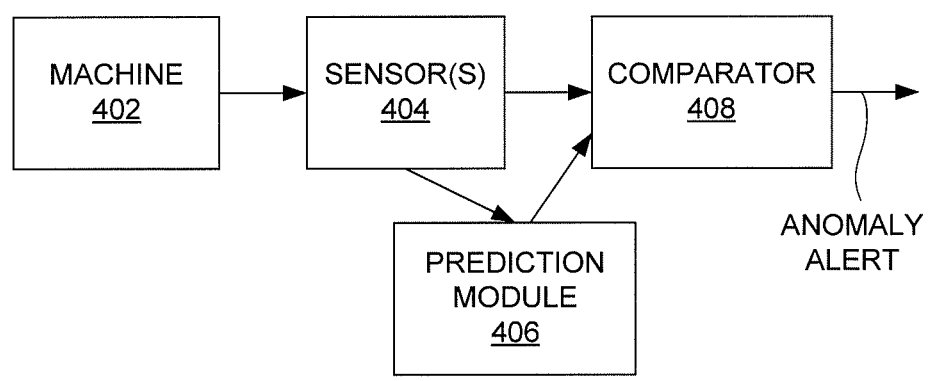
FIG. 4 is an implementation of the sensor data analysis system of FIG. 1 for anomaly detection in one or more systems according to an example embodiment of the present disclosure.

FIG. 4, with reference to FIGS. 1 through 3, is an implementation of the sensor data analysis system 100 of FIG. 1 for anomaly detection in one or more systems according to an example embodiment of the present disclosure. More particularly, FIG. 4 depicts anomaly detection modules based on autoregression based forecasting. The parameters of the machine (or a system) 402 are measured by one or more sensors 404. The output from the one or more sensors 404 are transmitted (or communicated) to the prediction module 406 which forecasts (using the incremental autoregression technique) the next value from the sensor (V_predicted). This forecasted value is compared with the next value (V_actual) from the one or more sensors 404 by a comparator 408. The comparator 408 computes if the absolute difference of V_actual and V_predicted exceeds the threshold V_diff. If it exceeds, then an anomaly alert is emitted from the comparator 408.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure enables the sensor data analysis system 100 to perform incremental autoregression technique on a time series data comprising one or more blocks of observation values. Unlike conventional autoregression techniques where memory consumption is more, the results of the proposed incremental autoregression technique leads to reduced memory consumption for various size of data flowing in an input, thereby ensuring lower memory footprint due to the use/implementation of incremental autoregression technique. The embodiments of the present disclosure further enable the sensor data analysis system 100 to process batch autoregression with minimal memory as shown in the graphical representation depicted in FIG. 3. The embodiments of the present disclosure further enable the sensor data analysis system 100 to execute multiple autoregression jobs simultaneously on the same computer system to process autoregression job by using incremental autoregression technique ensuring lower memory footprint which otherwise exceeds its main memory capacity without implementation of incremental autoregression technique. The embodiments of the present disclosure further enable the sensor data analysis system 100 to process autoregression job with a small number of computing nodes and enable streaming autoregression without storing the entire stream (one-pass).

The embodiments of the present disclosure enable the sensor data analysis system 100 to be implemented in telemetry sensors systems for detecting one or more anomalies. Such systems may include sensors may include, but are not limited to, position sensors, altitude sensors, propulsion sub systems of aircraft, moving vehicles, and the like. In one aspect, the embodiments of the present disclosure enable the sensor data analysis system 100 to be implemented in equipment condition monitoring. Sensors that may be used in such equipment condition monitoring systems may include, but are not limited to vibration sensors, pressure sensors, temperature sensors, and the like. In another aspect, the embodiments of the present disclosure enable the sensor data analysis system 100 to be implemented in real-time anomaly detection methods and systems for environmental data streams that can be used to identify data that deviate from historical patterns using one or more sensors. The one or more sensors in such cases, may include, but are not limited to, wind speed sensors, temperature sensors, and the like. Wind speed sensors and temperature sensors combined may be used to detect/predict anomalous weather condition.

In yet another aspect, the embodiments of the present disclosure enable the sensor data analysis system 100 to be implemented in resource constrained devices, where incremental autoregression technique can be executed. The embodiments of the present disclosure enable autoregression coefficients to be computed in the resource-constrained devices, for example, smart phones, gateway devices, and the like to provide anomaly detection capabilities in edge devices. The embodiments of the present disclosure can prevent such anomaly detections in the cloud, to reduce alert response times; rather, anomaly detection in real time may be done in the edge devices itself.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A computer implemented method for analyzing and processing of sensor data based on incremental autoregression technique, comprising:
   (a) processing a time series data, by an input processing module, by implementing a model data structure for capturing features that are relevant for processing by the input processing module, to obtain one or more blocks of observation values;
   (b) reading, by the input processing module, a first observation value from said one or more blocks of observation values;
   (c) updating, by an updating module, a set of convolution values stored in a memory with said first observation value;
   (d) updating, by the updating module, a partial sum by adding said first observation value to said partial sum;
   (e) incrementing, by the updating module, a count of observations in a count variable each time an observation value is read;
   (f) repeating (b) till (e) until a last observation value is read from a last block from said one or more blocks of observation values to obtain an updated set of convolution values, an updated partial sum, and an updated count;
   (g) computing, by a computation module, a first set of elements for a first matrix using at least one of (i) said updated set of convolutions values, (ii) summation of observation values computed from said updated partial sum, or (iii) said updated counts;
   (h) computing, by the computation module, a second set of elements for a second matrix using at least one of (i) said updated set of convolution values; or (ii) said summation of observation values computed from said partial sum; and
   (i) generating, by a vector generation module, a vector of autoregression coefficients for the received time series data based on said first matrix and said second matrix; wherein the vector of autoregression coefficients is generated periodically at one or more pre-defined intervals; wherein when a vector of autoregression coefficients is generated at a time t1, then a vector of autoregression coefficients at a time t1+M is generated by updating a set of convolutions values, a summation of observation values, and a count computed at time t1+M with a stored value of a set of convolutions values, a summation of observation values, and a count computed at time t1; wherein said vector of autoregression coefficients is generated at one or more pre-defined intervals in a streaming mode.

2. The computer implemented method of claim 1, wherein said time series data is obtained from one or more sensors.

3. The computer implemented method of claim 1, wherein said vector of autoregression coefficients is generated in a batch mode.

4. A computer implemented system for analyzing and processing of sensor data based on incremental autoregression technique, comprising:
   a memory storing instructions, and a set of convolution values;
   a communication interface; and
   a hardware processor coupled to said memory, wherein said hardware processor is configured by said instructions to
   (a) process a time series data, by an input processing module, by implementing a model data structure for capturing features that are relevant for processing by the input processing module, to obtain one or more blocks of observation values;
   (b) read, by the input processing module, a first observation value from said one or more blocks of observation values;
   (c) update, by an updating module, a set of convolution values stored in said memory with said first observation value;
   (d) update, by the updating module, a partial sum by adding said first observation value to said partial sum;
   (e) increment, by the updating module, a count of observations in a count variable each time an observation value is read;
   (f) repeat (b) till (e) until a last observation value is read from a last block from said one or more blocks of observation values to obtain an updated set of convolution values, an updated partial sum, and an updated count;
   (g) compute, by a computation module, a first set of elements for a first matrix using at least one of (i) said updated set of convolution values, (ii) summation of observation values computed from said updated partial sum, or (iii) said updated count;
   (h) compute, by a computation module, a second set of elements for a second matrix using at least one of (i) said updated set of convolution values, or (ii) said summation of observation values computed from said partial sum, and
   (i) generate, by a vector generation module, a vector of autoregression coefficients for the received time series data based on said first matrix and said second matrix; wherein the vector of autoregression coefficients is generated periodically at one or more pre-defined intervals; wherein when a vector of autoregression coefficients is generated at a time t1, then a vector of autoregression coefficients at a time t1+M is generated by updating a set of convolutions values, a summation of observation values, and a count computed at time t1+M with a store values of a set of convolution values, a summation of observation values, and a count computed at time t1; wherein said vector of autoregression coefficients is generated at one or more pre-defined intervals in a streaming mode.

5. The computer implemented system of claim 4, wherein said time series data is obtained from one or more sensors.

6. The computer implemented system of claim 4, wherein said vector of autoregression coefficients is generated in a batch mode.

7. One or more non-transitory machine readable information storage mediums comprising one or more instructions which when executed by one or more hardware processors for analyzing and processing of sensor data based on incremental autoregression technique, causes:

(a) processing a time series data, by an input processing module, by implementing a model data structure for capturing features that are relevant for processing by the input processing module, to obtain one or more blocks of observation values;
(b) reading, by the input processing module, a first observation value from said one or more blocks of observation values;
(c) updating, by an updating module, a set of convolution values stored in a memory with said first observation value;
(d) updating, by the updating module, a partial sum by adding said first observation value to said partial sum;
(e) incrementing, by the updating module, a count of observations in a count variable each time an observation value is read;
(f) repeating (b) till (e) until a last observation value is read from a last block from said one or more blocks of observation values to obtain an updated set of convolution values, an updated partial sum, and an updated count;
(g) computing, by a computation module, a first set of elements for a first matrix using at least one of (i) said updated set of convolutions values, (ii) summation of observation values computed from said updated partial sum, or (iii) said updated counts;
(h) computing, by the computation module, a second set of elements for a second matrix using at least one of (i) said updated set of convolution values; or (ii) said summation of observation values computed from said partial sum; and
(i) generating, by a vector generation module, a vector of autoregression coefficients for the received time series data based on said first matrix and said second matrix; wherein the vector of autoregression coefficients is generated periodically at one or more pre-defined intervals; wherein when a vector of autoregression coefficients is generated at a time $t1$, then a vector of autoregression coefficients at a time $t1+M$ is generated by updating a set of convolutions values, a summation of observation values, and a count computed at time $t1+M$ with a stored value of a set of convolutions values, a summation of observation values, and a count computed at time $t1$; wherein said vector of autoregression coefficients is generated at one or more pre-defined intervals in a streaming mode.

8. The one or more non-transitory machine readable information storage mediums of claim 7, wherein said time series data is obtained from one or more sensors.

9. The one or more non-transitory machine readable information storage mediums of claim 7, wherein said vector of autoregression coefficients is generated in a batch mode.

* * * * *